United States Patent
Nakamoto

(10) Patent No.: US 8,069,694 B2
(45) Date of Patent: Dec. 6, 2011

(54) KEY DEVICE

(75) Inventor: Yuji Nakamoto, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 12/695,972

(22) Filed: Jan. 28, 2010

(65) Prior Publication Data

US 2010/0192649 A1    Aug. 5, 2010

(30) Foreign Application Priority Data

Feb. 3, 2009   (JP) ................................. 2009-022915

(51) Int. Cl.
   *B60R 25/02* (2006.01)
(52) U.S. Cl. .......................................... 70/186; 70/252
(58) Field of Classification Search ............ 70/182–186, 70/252
   See application file for complete search history.

(56) References Cited

U.S. PATENT DOCUMENTS

| | | | | |
|---|---|---|---|---|
| 5,271,252 A * | 12/1993 | Yasuhara et al. | ................. | 70/186 |
| 5,289,707 A * | 3/1994 | Suzuki | ........................... | 70/252 |
| 5,685,183 A | 11/1997 | Hattori et al. | | |
| 5,906,120 A * | 5/1999 | Thacker et al. | ................. | 70/186 |
| 6,125,671 A * | 10/2000 | Suzuki | ........................... | 70/186 |
| 6,810,701 B2 * | 11/2004 | Lee et al. | ......................... | 70/186 |
| 6,941,779 B2 * | 9/2005 | Shigeyama et al. | ............. | 70/186 |
| 2003/0233991 A1 * | 12/2003 | Harada et al. | ............... | 123/179.1 |
| 2004/0003632 A1 * | 1/2004 | Ohtaki et al. | .................... | 70/252 |
| 2004/0107750 A1 * | 6/2004 | Fukushima | ..................... | 70/186 |
| 2008/0087056 A1 * | 4/2008 | Tsukazaki | ....................... | 70/182 |
| 2009/0139284 A1 * | 6/2009 | Sugimoto | ........................ | 70/186 |
| 2010/0024495 A1 * | 2/2010 | Nakamoto et al. | .............. | 70/252 |
| 2010/0192645 A1 * | 8/2010 | Nakamoto | ........................ | 70/183 |

FOREIGN PATENT DOCUMENTS

JP    2000-229557 A    8/2000

OTHER PUBLICATIONS

European Search Report dated Jun. 4, 2010 from corresponding European Patent Application No. EP 10 00 0865.

* cited by examiner

*Primary Examiner* — Suzanne Barrett

(74) *Attorney, Agent, or Firm* — Roberts Mlotkowski Safran & Cole, P.C.

(57) ABSTRACT

Rotation of a rotating member to a predetermined rotational position is properly regulated by a regulating member even when a thickness of the regulating member in a rotating shaft direction is made smaller. In a steering lock device, a pair of restricting portions formed in a release frame of a release link is disposed at both-sides of a link in front- and rear-direction, so restricts tilt of the link to both-sides in the front- and rear-direction. For this reason, even if thickness of the link in the front- and rear-direction in the vicinity of the shaft is made smaller, when rotation of a cam shaft from an "ACC" position to a "LOCK" position is regulated by the link, tilt of the link to both-sides in the front- and rear-direction can be suppressed, so that the link can properly regulate rotation of the cam shaft from the "ACC" position to the "LOCK" position.

7 Claims, 8 Drawing Sheets

KEY DEVICE

CROSS-REFERENCE TO RELATED APPLICATION

This application claims priority under 35 USC 119 from Japanese Patent Application No. 2009-022915, the disclosure of which is incorporated by reference herein.

BACKGROUND OF THE INVENTION

1. Technical Field

The present invention relates to a key device that regulates rotation of a key.

2. Related Art

There are key devices in which a lifter is disposed at one side of a rotating shaft direction of a lock plate (for example, see Japanese Patent Application Laid-Open (JP-A) No. 2000-229557).

In such key device, when the lifter is rotated by rotation of a key knob to an "ACC position", rotation of the key knob to the "ACC position" is regulated by the lock plate not being rotated together with the lifter, while rotation of the key knob to the "ACC position" is allowed by the lock plate being rotated together with the lifter.

Here, in the key device as described above, it is preferable that tilt of the lock plate to both sides in the rotating shaft direction can be regulated and the lock plate can properly regulate rotation of the key knob to the "ACC position", particularly even when the thickness of the lock plate in the rotating shaft direction of the lock plate is made smaller in order to provide a small size lock plate.

SUMMARY OF THE INVENTION

In view of the aforementioned circumstances, an object of the present invention is to provide a key device in which, even when the thickness of a regulating member in a rotating axis direction is made smaller, the regulating member can properly regulate rotation of a rotating member to a predetermined rotational position.

A key device according to a first aspect of the present invention includes: a rotating member that is rotated by rotation of a key; an allowing member that is rotated by the rotating member when the rotating member is rotated to a predetermined rotational position; a regulating member provided to correspond to the allowing member, that regulates rotation of the rotating member to the predetermined rotational position by not rotating together with the allowing member when the rotating member is rotated to the predetermined rotational position, and that allows rotation of the rotating member to the predetermined rotational position by rotating together with the allowing member when the rotating member is rotated to the predetermined rotational position; and a pair of restricting portions provided at the allowing member and disposed at both ends of the regulating member in a rotating axis direction, that restrict tilt of the regulating member to both sides (one side/the other side) in the rotating axis direction.

In a key device according to a second aspect of the present invention in the key device of the first aspect, the restricting portions are provided to face each other with the regulating member being sandwiched between the restricting portions.

A key device according to a third aspect of the present invention in the key device of the first or second aspect, the restricting portions restrict tilt of the regulating member at a portion of the regulating member that regulates rotation of the rotating member to the predetermined position.

A key device according to a fourth aspect of the present invention in the key device of any one of the first to the third aspects, a distance between the pair of restricting portions in the rotating axis direction, and a width in the rotating axis direction of a portion of the regulating member that regulates rotation of the rotating member to the predetermined position, are substantially the same.

A key device according to a fifth aspect of the present invention in the key device of any one of the first to the fourth aspects, the allowing member includes an allowing portion including the pair of restricting portions and a portion which connects the pair of restricting portions, the allowing portion enabling cover a portion of the regulating member that regulates rotation of the rotating member to the predetermined position.

In the key device of the first aspect, the rotating member is rotated by rotation of the key, and when the rotating member is rotated to the predetermined rotational position, the allowing member is rotated by the rotating member. Further, the regulating member is provided so as to correspond to the allowing member.

Moreover, when the rotating member is rotated to the predetermined rotational position, by the regulating member being not rotated together with the allowing member, the regulating member regulates rotation of the rotating member to the predetermined rotational position, so as to regulate rotation of the key. To the contrary, when the rotating member is rotated to the predetermined rotational position, by the regulating member being rotated together with the allowing member, the regulating member allows rotation of the rotating member to the predetermined rotational position, so as to allow rotation of the key.

Here, the pair of restricting portions provided in the allowing member is disposed respectively at both sides in the rotating axis (shaft) direction of the regulating member, so as to restrict tilt of the regulating member to both sides in the rotating axis direction of the rotating member. For this reason, even when the thickness of the regulating member in the rotating axis direction is made smaller, tilt of the regulating member to both sides in the rotating axis direction can be suppressed, and the regulating member makes it possible to properly regulate rotate of the rotating member to the predetermined rotational position.

In the key device of the second aspect or the fourth aspect, the pair of restricting portions face each other with the regulating member being interposed therebetween. For this reason, the pair of restricting portions restrict more effectively the tilt of the regulating member to both sides in the rotating axis direction.

In the key device of the third aspect or the fifth aspect, the restricting portions restrict tilt of the regulating member at a portion of the regulating member which portion regulates rotation of the rotating member to the predetermined position. For this reason, the restricting portions make it possible to effectively restrict tilt of the regulating member to the rotating axis direction.

BRIEF DESCRIPTION OF THE DRAWINGS

Embodiments of the invention will be described in detail with reference to the following figures, wherein.

DETAILED DESCRIPTION OF THE INVENTION

First Embodiment

Figure 6:
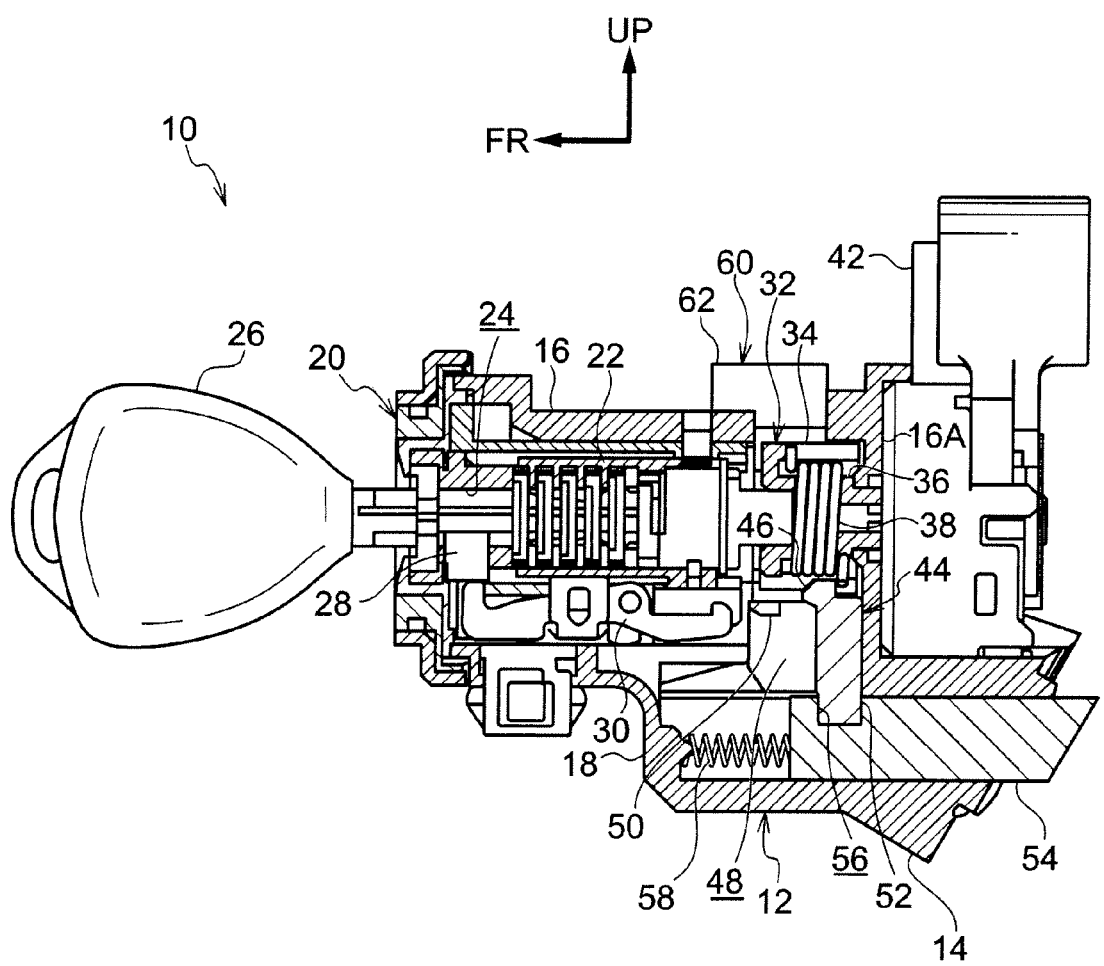
FIG. 6 is a cross sectional view showing the steering lock device according to the exemplary embodiment of the present invention when seen form the left side.

FIG. 6 shows a cross sectional view of a steering lock device 10 that serves as a key device according to a first exemplary embodiment of the present invention when seen from the left side. In the drawings, the front side of the steering lock device 10 is indicated by arrow FR, the upper side of the steering lock device 10 is indicated by arrow UP, and the right side of the steering lock device 10 is indicated by arrow RH.

Figure 5:
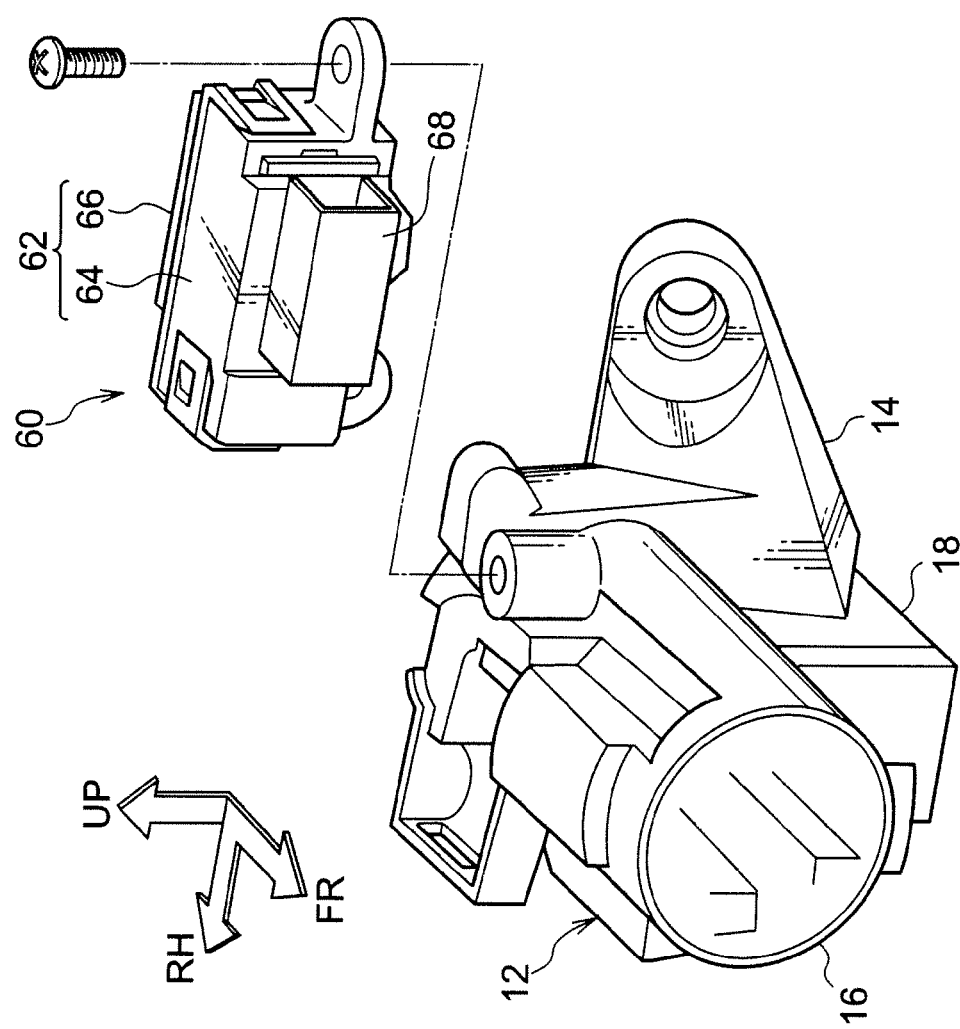
FIG. 5 is an exploded perspective view showing a lock body and an interlock unit in the steering lock device according the exemplary embodiment of the present invention when seen obliquely from the front of the left side.

As shown in FIG. 6, the steering lock device 10 according to the present exemplary embodiment is equipped with a lock body 12 that serves as an accommodating member, and a fixed piece 14 (see FIG. 5) having a substantially semi-cylinder shape is formed at the rear end of the lower side portion of the lock body 12. The bracket (not shown in the drawings) having a substantially semi-cylinder shape is mounted to the fixed piece 14. A steering post (not shown in the drawings) of a vehicle is fitted in an inner portion of the bracket and the fixed piece 14, whereby the lock body 12 is fixed to the steering post, and the steering lock device 10 is mounted to the steering post.

A substantially cylinder shaped accommodating cylinder 16 is formed at the upper side portion of the lock body 12, and a rear wall 16A is formed at the rear end of the accommodating cylinder 16. A lock cylinder 18 having a substantially rectangular tube shape is formed at the lower side of the rear side portion of the accommodating cylinder 16, and the respective inner sides of the accommodating cylinder 16 and the lock cylinder 18 communicate with each other. The front surface of the lock cylinder 18 is closed, and the rear surface of the lock cylinder 18 is opened toward the rear side via the fixed piece 14.

A substantially circular cylinder (column) shaped ignition cylinder 20 that serves as a key cylinder is accommodated within the accommodating cylinder 16. The front end of the ignition cylinder 20 is made to protrude from the front end of the accommodating cylinder 16 to the front side. The front end of the ignition cylinder 20 is disposed in an instrument panel (not shown in the drawings) of a vehicle, and the front surface of the ignition cylinder 20 is directed from the instrument panel to the interior of the vehicle.

A key rotor 22 having a substantially circular cylinder (column) shape and serving as an insert member is accommodated in the ignition cylinder 20, and front side movement of the key rotor 22 is stopped (not allowed). An insertion hole 24 having a rectangular pillar shape is formed within the key rotor 22, and the insertion hole 24 is opened from the front surface of the key rotor 22.

The key rotor 22 is arranged at a "LOCK" position that serves as a predetermined rotational position, and an ignition key 26 (a regular key) serving as a key can be inserted in and pulled out from the insertion hole 24. By the ignition key 26 being inserted in the insertion hole 24 and operated to rotate, the key rotor 22 can be rotated in the ignition cylinder 20, whereby the key rotor 22 can be arranged at the "ACC" position, "ON" position or "START" position. Further, only when the key rotor 22 is arranged at the "LOCK" position, the ignition key 26 can be inserted in and pulled out from the insertion hole 24, and when the key rotor 22 is arranged at the "ACC" position, "ON" position or "START" position, the operation of the ignition key 26 being inserted in and pulled out from the insertion hole 24 is regulated.

A slide piece 28 having a substantially U-shaped frame-like configuration is provided in the lower portion of the front portion of the key rotor 22 so as to be movable in the vertical (upper and lower) direction (in the radial direction of the key rotor 22). The lower side surface (the outer side surface in the radial direction of the key rotor 22) of the slide piece 28 abuts against the inner peripheral surface of the ignition cylinder 20 so that movement of the slide piece to the lower side direction (to the outer side in the radial direction of the key rotor 22) is stopped (not allowed). The lower side surface of the slide piece 28 is curved along the inner peripheral surface of the ignition cylinder 20, and the slide piece 28 is rotatable integrally with the key rotor 22. Further, the lower side surface of the slide piece 28 is opened toward the lower side via the outer peripheral portion of the ignition cylinder 20.

The upper portion (the inner side portion in the radial direction of the key rotor 22) of the slide piece 28 forms the outer peripheral surface of the insertion hole 24 of the key rotor 22. In the state in which the ignition key 26 is inserted in the insertion hole 24, the ignition key 26 regulates movement of the slide piece 28 to the upper side (to the inner side in the radial direction of the key rotor 22). To the contrary, in the state in which the ignition key 26 is pulled out from the insertion hole 24, movement of the slide piece 28 to the upper side is allowed.

An elongated plate-shaped lock plate 30 is supported by the lower portion of the ignition cylinder 20 at the intermediate portion in the longitudinal (front and rear) direction in such a manner as to be rotatable and movable in the vertical (upper and lower) direction. The lock plate 30 is urged in a direction to which it moves upper side, and further, is urged such that the front end of the lock plate rotates to the upper side and the rear end thereof rotates to the lower side. A front side portion and a rear side portion of the lock plate 30 are each formed substantially into an L-shaped plate, and a front end and a rear end of the lock plate 30 are each made to protrude to the upper side.

The front end of the lock plate 30 passes through (penetrates) the outer peripheral portion of the ignition cylinder 20 and is made to abut against the lower side surface of the slide piece 28. When the ignition key 26 is inserted in the insertion hole 24, movement of the slide piece 28 to the upper side is regulated, whereby rotation of the lock plate 30 by means of the urging force is regulated. To the contrary, when the ignition key 26 is pulled out from the insertion hole 24, movement of the slide piece 28 to the upper side is allowed, whereby the front end of the lock plate 30 moves the slide piece 28 to the upper side by means of the urging force, the front end of the lock plate 30 is rotated to the upper side, and the rear end of the lock plate 30 is rotated to the lower side. Moreover, when the key rotor 22 is arranged at the "ACC" position, "ON" position or "START" position, the front end of the lock plate 30 is made to abut against the outer peripheral surface of the key rotor 22, whereby rotation of the lock plate 30 by means of the urging force is regulated.

A cam shaft 32 that serves as a rotating member is rotatably accommodated within the accommodating cylinder 16 at the rear side of the ignition cylinder 20. A substantially cylinder shaped outer cylinder 34 is provided at the side of the outer periphery of the cam shaft 32 and a substantially cylinder shaped inner cylinder 36 is provided at the side of the inner periphery of the cam shaft 32. The outer cylinder 34 and the inner cylinder 36 are integrated with each other at their respective front ends. Further, the inner cylinder 36 passes through (penetrates) the rear wall 16A of the accommodating cylinder 16 and protrudes to the rear side of the accommodating cylinder 16.

The rear end of the key rotor 22 is fitted into the inner cylinder 36, and the cam shaft 32 is rotatable so as to be integrated with the key rotor 22.

A return spring 38 that serves as a rotation urging member is accommodated within the outer cylinder 34 on the outer periphery of the inner cylinder 36, and one end (the front side end) of the return spring 38 is connected (latched) to the outer cylinder 34. When the cam shaft 32 is moved to be arranged from the "ON" position to the "START" position, the other end (the rear side end) of the return spring 38 is connected within the accommodating cylinder 16, and the cam shaft 32 is urged in a direction from the "START" position to the "ON" position.

An inclined surface (not shown in the drawings) is formed in the lower side portion of the outer cylinder 34, and the inclined surface is made to slope to a direction which is from the "START" position of the key rotor 22 to the "LOCK" position via the "ON" position and the "ACC" position in accordance from the rear side to the front side. A regulating surface 40 (see FIGS. 7 and 8) is formed on the upper side portion of the outer cylinder 34, and the regulating surface 40 is disposed perpendicular to the circumferential direction of the outer cylinder 34.

An ignition switch 42 is fixed at the rear side of the accommodating cylinder 16, and the inner cylinder 36 rear end of the cam shaft 32 is inserted in the ignition switch 42. As a result, due to the cam shaft 32 being connected to the ignition switch 42 and the cam shaft 32 being rotated integrally with the key rotor 22, the ignition switch 42 can be operated.

A substantially rectangular pillar shaped slider 44 that serves as a connecting member is accommodated in the accommodating cylinder 16 at the lower side of the cam shaft 32, and the slider 44 is movable (slidable) in the longitudinal (front and rear) direction integrally with a lock bar 54, as described below.

A moving protrusion 46 having a pillar shape is formed in a rear portion of the slider 44, and the moving protrusion 46 protrudes to the upper side from the slider 44. An inclined surface of the cam shaft 32 (outer cylinder 34) comes into contact with the moving protrusion 46 by means of the urging force of a compression spring 58 described later, by this, the slider 44 abuts against the rear wall 16A of the accommodating cylinder 16 such that movement to the rear side is stopped (not allowed), and rotation of the cam shaft 32 is inhibited and the key rotor 22 is, as described above, arranged at the "LOCK" position.

A plate-shaped engagement hole 48 is formed in the front side portion of the slider 44 at the central part in the horizontal (left and right) direction. The engagement hole 48 is opened at the front side, upper side and lower side of the slider 44. A substantially trapezoidal plate-shaped engagement protrusion 50 is formed at the front end and upper end of the slider 44 and the engagement protrusion 50 is disposed within the engagement hole 48. A rectangular pillar shaped fitting protrusion 52 is formed at the rear end of the slider 44 and the fitting protrusion 52 is made to protrude to the lower side from the slider 44.

A substantially rectangular pillar shaped lock bar 54 that serves as a lock member is accommodated within the lock cylinder 18. The lock bar 54 is guided by the lock cylinder 18 and is movable (slidable) in the longitudinal (front and rear) direction.

A fitting concave portion 56 having a rectangular pillar shape is formed at the upper end of the front portion of the lock bar 54. The fitting concave portion 56 is opened at the upper side from the lock bar 54. The fitting protrusion 52 of the slider 44 is fitted into the fitting concave portion 56, and the lock bar 54 can be moved in the longitudinal (front and rear) direction in such a manner as to be integrated with the slider 44.

A compression spring 58 that serves as lock urging member is bridged between the front end of the lock cylinder 18 and the front end of the lock bar 54. The compression spring 58 urges the lock bar 54 and the slider 44 to the rear side. As a result, due to the urging force of the compression spring 58, the slider 44 is made to abut against the rear wall 16A of the accommodating cylinder 16, and movement of the slider 44 and the lock bar 54 to the rear side is stopped (not allowed).

The lock bar 54 protrudes to the rear side from the lock cylinder 18 and also protrudes to the rear side from the fixed piece 14. The lock bar 54 is made to pass through (penetrates) the above-described steering post and is engaged with the steering shaft (not shown in the drawings) within the steering post. As a result, rotation of the steering shaft is locked and rotation of a steering wheel (not shown in the drawings) which is fixed at the upper end of the steering shaft is locked.

Figure 4:
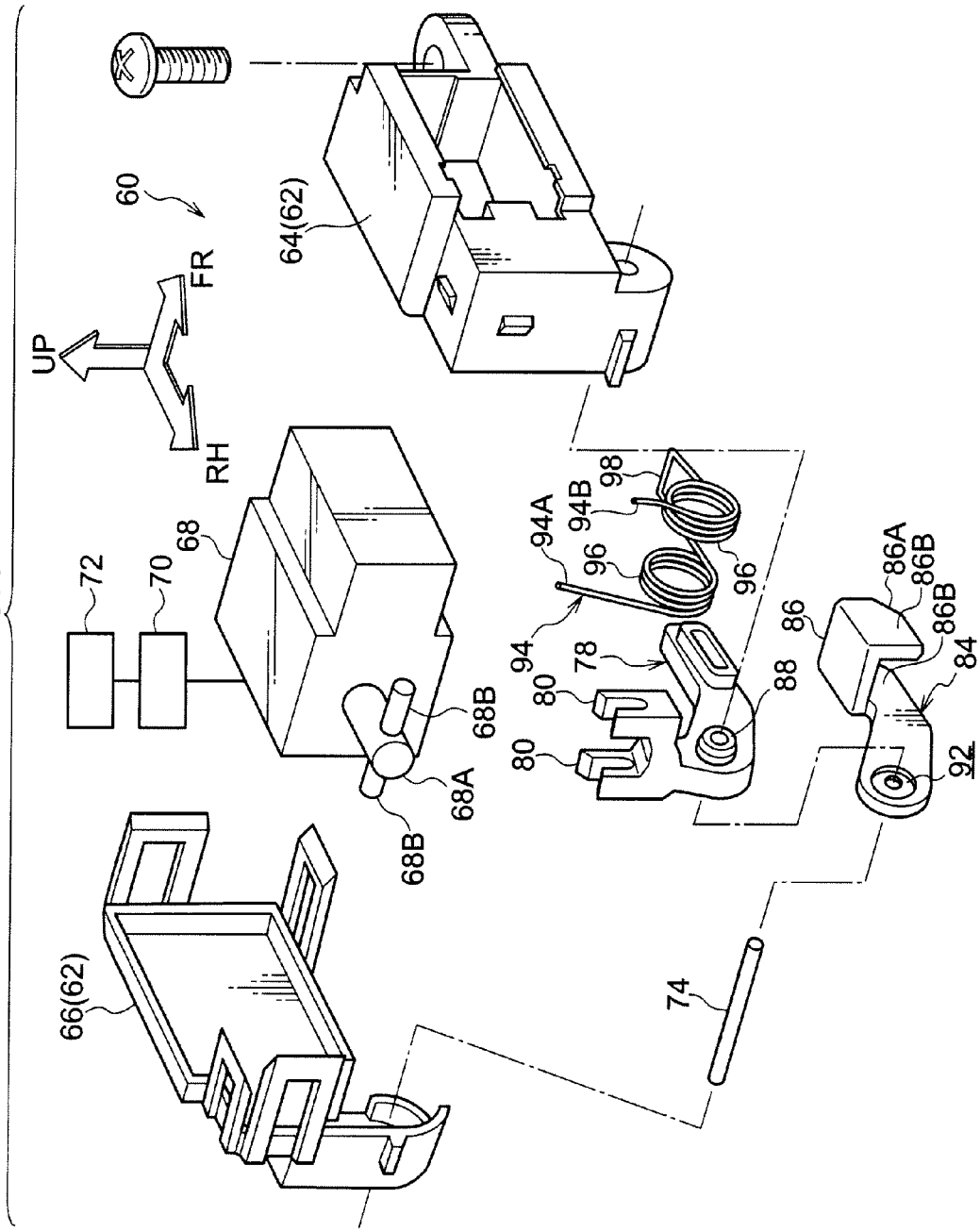
FIG. 4 is an exploded perspective view showing an interlock unit in the steering lock device according to the exemplary embodiment of the present invention when seen obliquely from the front of the right side.

As is also shown in FIG. 4, an interlock unit 60 serving as a key regulating device is mounted at the upper end of the accommodating cylinder 16 at the rear portion of the accommodating cylinder.

As shown in FIG. 4, a substantially rectangular parallelepiped box-shaped unit box 62 serving as a housing that is a subject to be assembled is provided at the outer periphery of the interlock unit 60. The unit box 62 is formed by a combination of a front side case 64 and a rear side cover 66. A lower wall of the unit box 62 is partially opened and the interior of the unit box 62 communicates with the interior of the accommodating cylinder 16.

A solenoid 68 that serves as a driving section is accommodated within the unit box 62. The solenoid 68 includes a circular cylinder (column) shaped plunger 68A serving as a driving member, and the tip end of the plunger 68A is protrude from the solenoid 68 to the right side. An engagement shaft 68B in the form of a circular shaft passes through (penetrates) the end of the plunger 68A, and the engagement shaft 68B protrudes from the plunger 68A in the longitudinal (front and rear) direction.

The solenoid 68 is connected to a shift lever device 72 of the vehicle via a vehicle control device 70. When a shift lever (not shown in the drawings) of the shift lever device 72 is operated to move to a shift position (an allowable shift position such as an "R" shift position, an "N" shift position, a "D" shift position or the like) other than the "P" shift position (a regulated shift position), the solenoid 68 is driven by control of the control device 70, to regulate movement of the plunger 68A to the right side, whereby an increase in the amount of the plunger 68A protruding from the solenoid 68 is regulated (see FIG. 7). To the contrary, when the shift lever of the shift lever device 72 is operated to move to the "P" shift position, the solenoid 68 is not driven, and movement of the plunger 68A to the right side is allowed, whereby an increase in the amount of the plunger 68A protruding from the solenoid 68 is allowed (see FIG. 8).

In the unit box 62, a circular shaft shaped shaft 74 (a support shaft) serving as a rotating axis (shaft) is supported at the right side and the lower side of the solenoid 68, and the shaft 74 is bridged between the case 64 and the cover 66 of the unit box 62 and extends in the longitudinal direction (front and rear direction).

Figure 1:
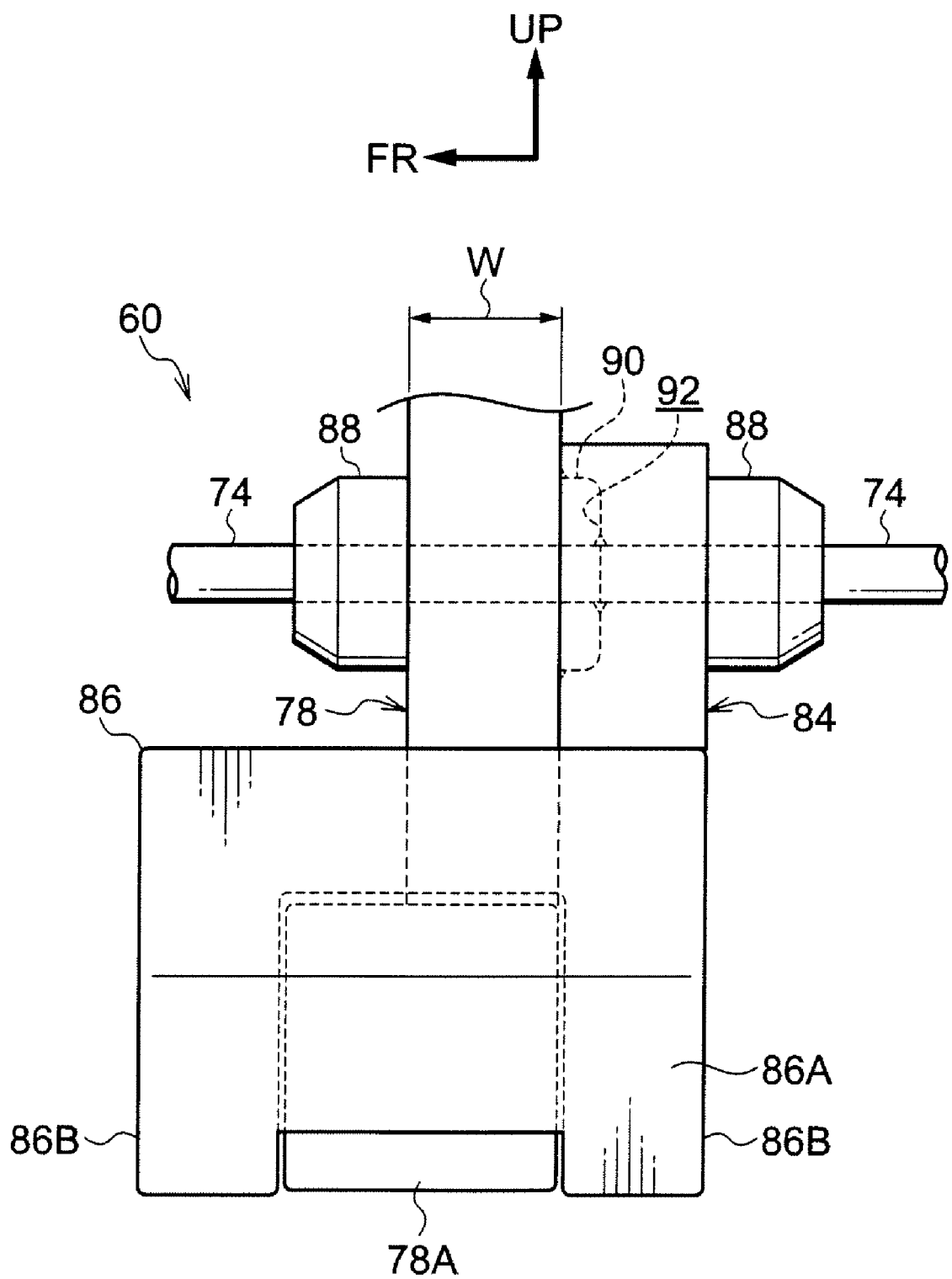
FIG. 1 is a side view showing a shaft, a link and a release link in a steering lock device according to an exemplary embodiment of the present invention when seen from the left side.
Figure 2:
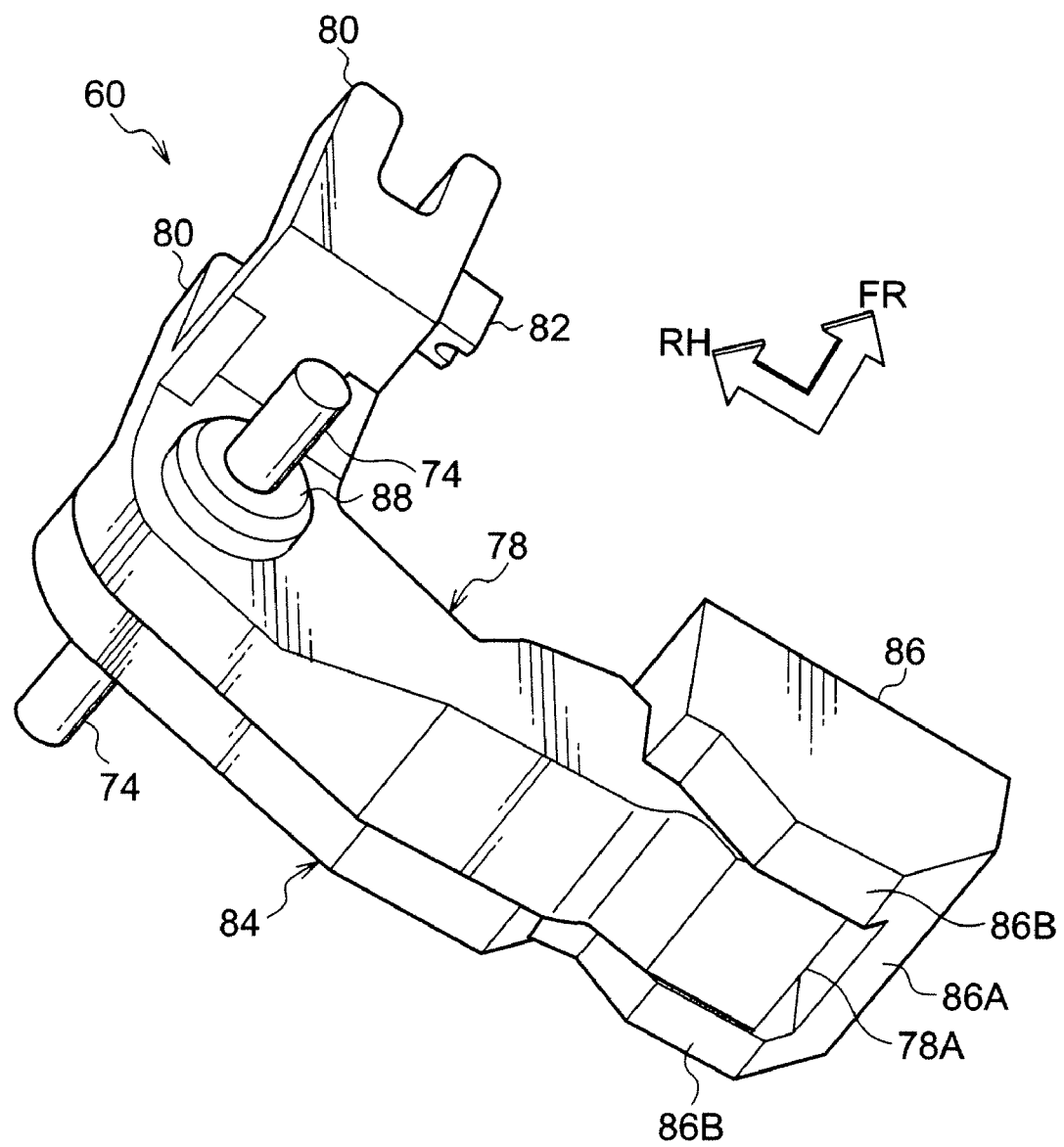
FIG. 2 is a perspective view showing the shaft, link and release link in the steering lock device according to the exemplary embodiment of the present invention when seen obliquely from the front of the lower side.
Figure 3:
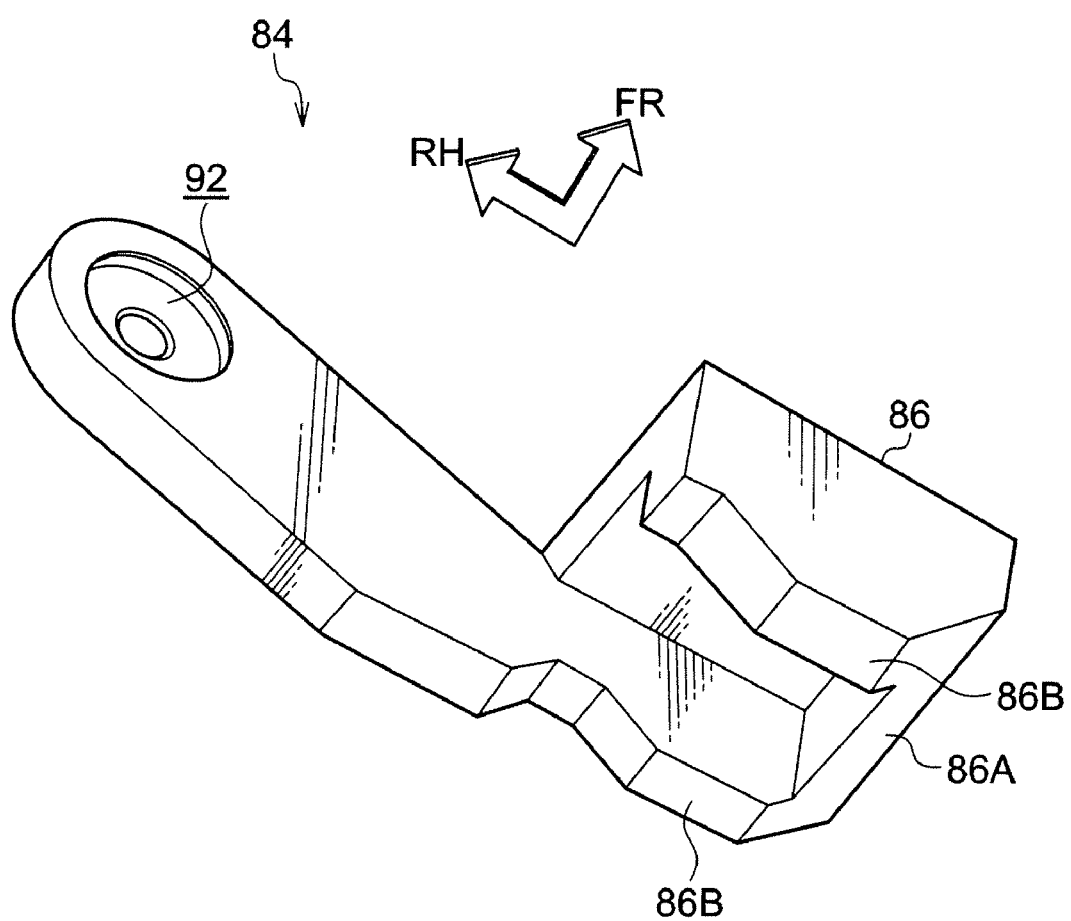
FIG. 3 is a perspective view showing the release link in the steering lock device according to the exemplary embodiment of the present invention when seen obliquely from the front of the lower side.

As shown in FIGS. 1 and 2, a longitudinal-direction intermediate portion of a link 78 having an substantially L-shaped cross sectional configuration and serving as a regulating member is supported by the shaft 74 in a rotatable manner. The shaft 74 passes through (penetrates) and is fitted in the link 78, and the movement of the link 78 to both sides in the longitudinal direction (in the front and rear direction) along the shaft 74 is regulated. A pair of U-shaped engagement frames 80 are formed integrally at the upper side end of the link 78. The pair of engagement frames 80 face each other in the longitudinal direction (front and rear direction). The tip end of the plunger 68A of the solenoid 68 is inserted between the pair of engagement frames 80, and the engagement shaft 68B of the plunger 68A tip end is inserted in the pair of engagement frames 80. As a result, the upper side end of the link 78 is engaged with the tip end of the plunger 68A in rotatable and movable manner.

A hook portion 82 having a U-shaped cross sectional configuration is formed integrally with the upper side end of the link 78 at the front and left sides of the link, and the interior of the hook portion 82 is opened to the left side.

An upper side end of a substantially plate-shaped release link 84 that serves as an allowing member is rotatably supported by the shaft 74 at the rear side of the link 78. The shaft 74 passes through (penetrates) and is fitted in the release link 84, and movement of the release link 84 to both sides in the longitudinal direction (front and rear direction) along the shaft 74 is regulated. A release frame 86 that serves as an allowing portion is formed at the lower side end of the release link 84, and the release frame 86 covers the upper side, front side, rear side and left side of the lower side end of the link 78. A release surface 86A is formed on the left side surface of the release frame 86 at the lower side portion. The release surface 86A is formed so as to be inclined toward the upper side as directed toward left side, and is disposed at the left side of the lower side end surface 78A of the link 78.

Substantially trapezoidal plate-shaped restricting portions 86B are formed in the release frame 86, respectively, at both sides of the lower side end of the link 78 in the longitudinal direction (front and rear direction) (at both sides of the link 78 in the direction along the rotating shaft (in the rotating axis direction)). The pair of restricting portions 86B are made to face each other with the lower side end of the link 78 being sandwiched therebetween, whereby tilt (movement) of the lower side end of the link 78 toward the both sides (one side/the other side) in the front and rear direction can be restricted. A distance between the pair of the restricting portions 86B in the front and rear direction (that is, the rotating shaft direction) is the substantially the same as (is slightly larger than) a width of the lower side end of the link 78 in the front and rear direction.

Substantially circular shaft-shaped spring holding shafts 88 that serve as a holding portion are formed in portions supported by the shaft 74 so as to be provided integrally with the link 78 and the release link 84 respectively. The shaft 74 passes through (penetrates) and is fitted in the spring holding shafts 88 at the central shaft portions thereof. The spring holding shaft 88 of the link 78 protrudes from the link 78 to the front side (which side is opposite to that in which the release link 84 is disposed). The spring holding shaft 88 of the release link 84 protrudes from the release link 84 to the rear side (which side is opposite to that in which the link 78 is disposed).

A substantially circular cylinder (column) shaped fitting convex portion 90 that forms a fitting portion is formed integrally with the rear side surface of the link 78 in a portion supported by the shaft 74, and the shaft 74 is made to pass through (penetrate) and fitted in the fitting convex portion 90 in the central shaft portion thereof.

A substantially circular cylinder (column) fitting concave portion 92 that forms the fitting portion is formed integrally with the front side surface of the release link 84 in a portion supported by the shaft 74, and the shaft 74 is made to pass through the fitting concave portion 92 in the central shaft portion thereof. The fitting convex portion 90 is fitted in the fitting concave portion 92 in a rotatable manner, whereby the link 78 and the release link 84 are positioned (aligned) in such a state as to be relatively rotatable.

A torsion spring 94 serving as an urging member that forms the link unit 76 is held in the link 78 and the release link 84, as shown in FIG. 4.

Spiral portions 96 having spiral configuration each serving as a holding member are formed at the front side portion and rear side portion of the torsion spring 94, respectively. The spring holding shaft 88 of the link 78 is inserted in the front side spiral portion 96 so as to be held by the spring holding shaft 88. The spring holding shaft 88 of the release link 84 is inserted in the rear side spiral portion 96 so as to be held by the spring holding shaft 88.

A U-shaped connecting portion 98 is formed at the intermediate portion of the torsion spring 94 in the longitudinal direction (front and rear direction). The connecting portion 98 connects the pair of spiral portions 96 with each other. As a result, the torsion spring 94 limits being away of the link 78 and the release link 84 in the longitudinal direction (front and rear direction), to restrict cancellation of a state in which the fitting convex portion 90 of the link 78 and the fitting concave portion 92 of the release link 84 are fitted each other. Further, the intermediate portion of the connecting portion 98 is disposed at the upper side of the lower side end of the link 78 and the lower side end of the release link 84.

The rear side end 94A of the torsion spring 94 protrudes to the upper side from the rear side spiral portion 96 and is caught by the cover 66. As a result, the torsion spring 94 urges, at the intermediate portion of the connecting portion 98, the lower side end of the release link 84 to the lower side. The front side end 94B of the torsion spring 94 protrudes to the upper side upward from the front side spiral portion 96 and is caught in a hook portion 82 of the link 78. As a result, the link 78 is urged in a direction in which the lower side end thereof is rotated to the upper side, and the lower side end of the link 78 is made to abut against the upper side plate (which is provided to connect the pair of the restricting portions 86B in the front and rear direction at the upper side of the pair of the restricting portions 86B) of the release frame 86 of the release link 84, whereby the link 78 and the release link 84 are integrally rotatable.

Figure 7:
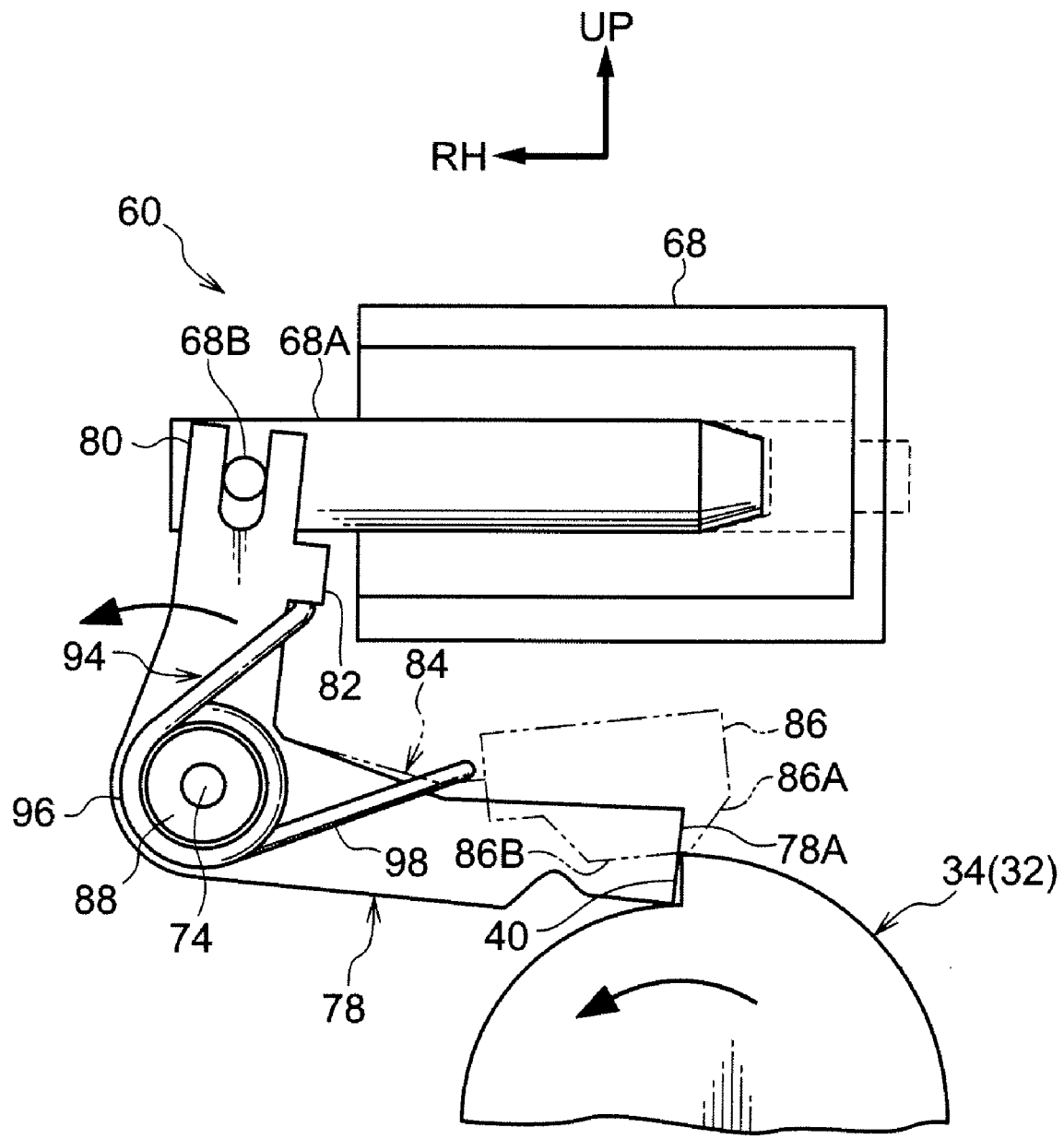
FIG. 7 is a cross sectional view showing an operation of an interlock unit when a shift lever is operated to be located at a shift position other than a "P" shift position in the steering lock device according to the exemplary embodiment of the present invention when seen form the front.
Figure 8:
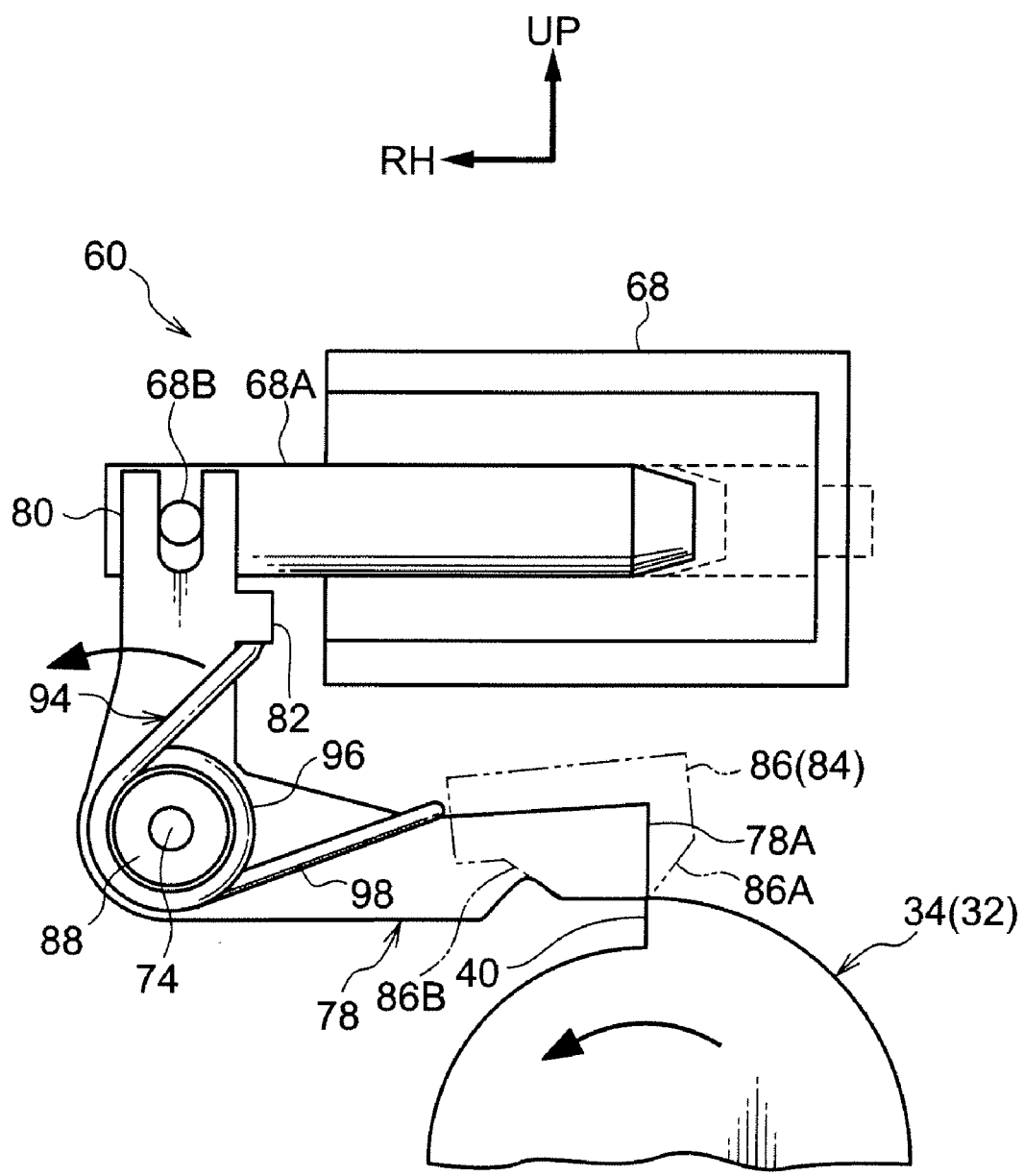
FIG. 8 is a cross sectional view showing an operation of an interlock unit when a shift lever is operated to be located at the "P" shift position in the steering lock device according to the exemplary embodiment of the present invention when seen from the front.

As shown in FIGS. 7 and 8, the lower side end of the link 78 and the lower side end (the release frame 86) of the release link 84 are made to protrude to the lower side from the open portion on the lower wall of the unit box 62, and are inserted in the accommodating cylinder 16 of the lock body 12. The release frame 86 of the release link 84 abuts against the outer peripheral surface of the cam shaft 32 (the outer cylinder 34) by means of urging force of the torsion spring 94 (the rear side spiral portion 96).

When the key rotor 22 and the cam shaft 32 are rotated from the "ACC" position to the "LOCK" position, the regulating surface 40 of the cam shaft 32 (the outer cylinder 34) is made to abut against the release surface 86A of the release link 84, and the lower side end of the release link 84 is moved to the upper side.

As shown in FIG. 7, when the shift lever is operated to move to a shift position other than the "P" shift position and an increase in the amount of the plunger 68A protruding from the solenoid 68 is regulated, rotation of the link 78 is regulated, and movement of the lower side end of the link 78 to the upper side (to the outer side in the radial direction of the accommodating cylinder 16) is regulated. To the contrary, as shown in FIG. 8, when the shift lever is operated to move to the "P" shift position and the increase in the amount of the plunger 68A protruding from the solenoid 68 is allowed, rotation of the link 78 is allowed and movement of the lower side end of the link 78 to the upper side is allowed.

Next, the operation of the exemplary embodiment is described.

In the steering lock device 10 having the above-described structure, the key rotor 22 and the cam shaft 32 are arranged at the "LOCK" position, and the lock bar 54 is made to protrude from the fixed piece 14 of the lock body 12 to the rear side to engage with the steering shaft, whereby rotation of the steering shaft and the steering wheel is locked.

Further, by the ignition key 26 being inserted in the insertion hole 24 of the key rotor 22 and operated to rotate, the key rotor 22 and the cam shaft 32 are rotated to the "ACC" position, "ON" position and "START" position, so that the ignition switch 42 is operated.

When the key rotor 22 and the cam shaft 32 are rotated from the "LOCK" position to the "ACC" position, the inclined surface of the cam shaft 32 (the outer cylinder 34) is rotated so that the moving protrusion 46 of the slider 44 is pressed to the front side, whereby the slider 44 and the lock bar 54 are moved to the front side against the urging force of the compression spring 58. For this reason, when the key rotor 22 and the cam shaft 32 are rotated to the "ACC" position, protruding of the lock bar 54 from the fixed piece 14 of the lock body 12 is cancelled, and engagement of the lock bar 54 to the steering shaft is cancelled. As a result, rotation of the steering shaft and the steering wheel is allowed.

Further, when the key rotor 22 and the cam shaft 32 are rotated from the "LOCK" position to the "ACC" position, the slider 44 is moved to the front side as described above, whereby the rear end of the lock plate 30 is temporarily moved to the lower side against the urging force and the engagement protrusion 50 of the slider 44 overstrides the rear end of the lock plate 30. As a result, the engagement protrusion 50 of the slider 44 is engaged with the rear end of the lock plate 30, so movement of the slider 44 and the lock bar 54 to the rear side by means of the urging force of the compression spring 58 is stopped.

In addition, when the key rotor 22 and the cam shaft 32 are moved from the "ACC" position and arranged at the "START" position via the "ON" position, the front end of the lock plate 30 abuts against the peripheral surface of the key rotor 22, whereby rotation of the rear end of the lock plate 30 to the lower side is regulated and the state in which the engagement protrusion 50 of the slider 44 is engaged with the rear end of the lock plate 30 is maintained. Further, when the key rotor 22 and the cam shaft 32 are rotated from the "ACC" position to the "LOCK" position, the ignition key 26 regulates movement of the slide piece 28 toward the inner side in the radial direction of the key rotor 22, and due to the front end of the lock plate 30 abutting against the slide piece 28, rotation of the rear end of the lock plate 30 to the lower side is regulated and the state in which the engagement protrusion 50 of the slider 44 is engaged with the rear end of the lock plate 30 is maintained.

Consequently, the state in which movement of the slider 44 and the lock bar 54 to the rear side by means of the urging force of the compression spring 58 is stopped (not allowed) is maintained, and the state of cancel of the lock bar 54 protruding from the fixed piece 14 of the lock body 12 is maintained. For this reason, permission of rotation of the steering shaft and the steering wheel is maintained.

When the key rotor 22 and the cam shaft 32 are arranged at the "LOCK" position and the ignition key 26 is pulled out from the insertion hole 24 of the key rotor 22, movement of the slide piece 28 toward the inner side in the radial direction of the key rotor 22 is allowed, so that the slide piece 28 is moved toward the inner side in the radial direction of the key rotor 22 and the front end of the lock plate 30 is rotated upward by means of the urging force. As a result, the rear end of the lock plate 30 is rotated to the lower side and engagement of the engagement protrusion 50 of the slider 44 with the rear end of the lock plate 30 is cancelled. Thus, the slider 44 and the lock bar 54 are moved to the rear side by means of the urging force of the compression spring 50 and the lock bar 54 is made to protrude from the fixed piece 14 of the lock body 12 to the rear side. For this reason, the lock bar 54 is engaged with the steering shaft, and rotation of the steering shaft and steering wheel is locked.

Moreover, as shown in FIG. 7 and FIG. 8, in the interlock unit 60, when the key rotor 22 and the cam shaft 32 is rotated from the "ACC" position to the "LOCK" position, the regulating surface 40 of the cam shaft 32 (the outer cylinder 34) abuts against the release surface 86A of the release link 84 (the release frame 86), and the lower side end (the release frame 86) of the release link 84 is moved to the upper side against the urging force of the torsion spring 94 (the rear side spiral portion 96).

As shown in FIG. 7, when the shift lever of the shift lever device 72 is operated to be located at a shift position other than the "P" shift position, the solenoid 68 is driven and the increase in the amount of the plunger 68A protruding from the solenoid 68 is regulated. For this reason, rotation of the link 78 is regulated and movement of the lower side end of the link 78 to the upper side is regulated.

Consequently, when the key rotor 22 and the cam shaft 32 are rotated from the "ACC" position to the "LOCK" position and the lower side end (the release frame 86) of the release link 84 is moved to the upper side, the link 78 is not rotated integrally with the release link 84 and the lower side end of the link 78 does not move to the upper side, whereby the lower side end surface 78A of the link 78 is engaged with (abuts against) the regulating surface 40 of the cam shaft 32 (the outer cylinder 32). For this reason, rotation of the key rotor 22 and the cam shaft 32 from the "ACC" position to the "LOCK" position is regulated by the link 78, and pull-out of the ignition key 26 from the insertion hole 24 of the key rotor 22 is regulated (locked).

As shown in FIG. 8, when the shift lever is operated to be located at the "P" shift position, the solenoid 68 is not driven and the increase in the amount of the plunger 68A protruding from the solenoid 68 is allowed. Accordingly, rotation of the link 78 is allowed and movement of the lower side end of the link 78 to the upper side is allowed.

As a result, when the key rotor 22 and the cam shaft 32 are rotated from the "ACC" position to the "LOCK" position and the lower side end (the release frame 86) of the release link 84 is moved to the upper side, the link 78 is rotated integrally with the release link 84 and the lower side end of the link 78 is moved to the upper side, whereby the lower side end surface 78A of the link 78 is not engaged with (does not abut against) the regulating surface 40 of the cam shaft 32 (the outer cylinder 34). For this reason, rotation of the key rotor 22 and the cam shaft 32 from the "ACC" position to the "LOCK" position is allowed, and pull-out of the ignition key 26 from the insertion hole 24 of the key rotor 22 is allowed.

In order to reduce the size of the interlock unit 60, it is necessary that the link 78 is made smaller so the thickness of the link in the front and rear direction at a region near a passing through (penetrating) portion where the shaft 74 passes through (penetrates) (dimension W in FIG. 1) is decreased. In this case, a distance by which the link 78 is supported by the shaft 74 becomes short, so that the link 78 is apt to be tilt-moved in the front and rear direction of the link 78 (along the axial direction of the shaft 74). Further, the rigidity of the link 78 in the front and rear direction becomes low, so that the link 78 is apt to be deformed in the front and rear direction.

Further, if there exists a play caused by dimensional errors between the shaft 74 and a shaft 74 passing through (penetrating) portion of the link 78, the link 78 is apt to be tilt-moved in the front and rear direction.

In the above-described case, as shown in FIG. 7, when the link 78 regulates rotation of the cam shaft 32 from the "ACC" position to the "LOCK" position (when the lower side end surface 78A of the link 78 is engaged with the regulating surface 40 of the cam shaft 32), there is a possibility that the link 78 is tilt-moved in the front and rear direction due to pressing force of the regulating surface 40 of the cam shaft 32 against the lower side end surface 78A of the link 78.

Here, the pair of restricting portions 86B formed at the lower side end (the release frame 86) of the release link 84 are disposed respectively at both sides of the link 78 in the front and rear direction, to restrict tilts of the link 78 to the both sides (one side/the other side) in the front and rear direction. For this reason, when the link 78 regulates rotation of the cam shaft 32 from the "ACC" position to the "LOCK" position, the tilts of the link 78 to the both sides in the front and rear direction can be suppressed irrespective of pressing force of the regulating surface 40 of the cam shaft 32 against the lower side end surface 78A of the link 78, and the strength of the link 78 engaging with the regulating surface 40 of the cam shaft 32 can be increased, and the link 78 makes it possible to properly regulate rotation of the cam shaft 32 from the "ACC" position to the "LOCK" position.

Further, the pair of restricting portions 86B face each other with the link 78 interposed between the restricting portions 86B. For this reason, when the link 78 regulates rotation of the cam shaft 32 from the "ACC" position to the "LOCK" position, the pair of restricting portions 86B can effectively restrict tilts of the link 78 to the both sides in the front and rear direction.

In addition, the pair of restricting portions 86B are disposed at both sides of the lower side end (a position that regulates rotation of the cam shaft 32 from the "ACC" position to the "LOCK" position, and the outer side end in rotational radial direction of the link 78) of the link 78 in the front and rear direction. For this reason, when the link 78 regulates rotation of the cam shaft 32 from the "ACC" position to the "LOCK" position, the pair of restricting portions 86B makes it possible to more effectively restrict tilts of the link 78 to both sides in the front and rear direction.

Moreover, the spring holding shaft 88 and the fitting convex portion 90 are formed integrally in the shaft 74 passing through (penetrating) portion of the link 78, so the distance at which the link 78 is supported by the shaft 74 is made longer. For this reason, when the link 78 regulates rotation of the cam shaft 32 from the "ACC" position to the "LOCK" position, the tilts of the link 78 to both sides in the front and rear direction can be more effectively suppressed.

In the present exemplary embodiment, a structure in which the fitting convex portion 90 is provided in the link 78 and the fitting concave portion 92 is provided in the release link 84 is shown, but an alternative structure in which the fitting concave portion 92 is provided in the link 78 and the fitting convex portion 90 is provided in the release link 84 is also possible.

Further, in the present exemplary embodiment, a structure in which the spring holding shafts 88 are respectively provided in the link 78 and the release link 84 is shown. However, a structure in which the pair of spring holding shafts 88 are provided in only the link 78 and the spring holding shaft 88 at the release link 84 side is made to pass through (penetrate) and fitted in the release link 84, or a structure in which the pair of spring holding shafts 88 are provided in only the release link 84 and the spring holding shaft 88 at the link 78 side is made to pass through (penetrate) and fitted in the link 78 is also possible.

What is claimed is:

1. A key device comprising:
    a rotating member having a regulating surface that is rotated by rotation of a key;
    an allowing member that is rotated by the rotating member when the rotating member is rotated to a predetermined rotational position;
    a regulating member provided to correspond to the allowing member, that regulates rotation of the rotating member to the predetermined rotational position by not rotating together with the allowing member when the rotating member is rotated to the predetermined rotational position, and that allows rotation of the rotating member to the predetermined rotational position by rotating together with the allowing member when the rotating member is rotated to the predetermined rotational position, said regulating member having a distal end that includes an end surface that selectively engages said regulating surface of said rotating member; and
    a pair of restricting portions included in the allowing member and disposed at both sides of the regulating member in a rotating axis direction of the regulating member that restrict tilt of the regulating member to said both sides in the rotating axis direction wherein the restricting portions are provided to face each other such that the distal end of the regulating member is sandwiched between the restricting portions, wherein one end portion of the allowing member that contacts the rotating member is disposed on both sides of the regulating member in the rotating axis direction such that the pair of restricting portions of the allowing member are disposed on both sides of the distal end of the regulating member in the rotating axis direction, and the other end portion of the allowing member which is rotatably supported on a rotating axis of the regulating member is disposed on only one side of the regulating member in the rotating axis direction.

2. The key device of claim 1, wherein the restricting portions restrict tilt of the regulating member at a portion of the regulating member that regulates rotation of the rotating member to the predetermined position.

3. The key device of claim 1, wherein a distance between the pair of restricting portions in the rotating axis direction, and a width in the rotating axis direction of a portion of the regulating member that regulates rotation of the rotating member to the predetermined position, are substantially the same.

4. The key device of claim 1, wherein the allowing member includes an allowing portion including the pair of restricting portions and a portion which connects the pair of restricting portions, the allowing portion enabling the covering of the distal end of the regulating member, the end surface of distal end regulating rotation of the rotating member to the predetermined position by abutting the regulating surface formed at the rotating member.

5. The key device of claim 1, wherein the regulating member includes first and second leg members joined together in an L shape, and is rotatably mounted on a shaft where said leg members are joined.

6. The key device of claim 5, further comprising a solenoid plunger, and a slidable coupling between said plunger and an end of said L shaped regulating member opposite from said end surface.

7. The key device of claim 1, wherein the pair of restricting portions extend beyond the end surface of the regulating member.

* * * * *